Patented Dec. 4, 1934

1,982,802

UNITED STATES PATENT OFFICE 1,982,802

PHOTOGRAPHIC EMULSION AND METHOD OF MAKING THE SAME

Ernest Govett, New York, N. Y., assignor to Govett, Ltd., New York, N. Y., a corporation of New York No Drawing. Application May 31, 1929, Serial No. 367,618

4 Claims. (Cl. 95—7)

This invention relates to photographic (i. e., light-sensitive) emulsions, more particularly to emulsions in which all or part of the silver is present as bromide. The chief object of the invention is to provide an emulsion in which substantially less silver may be used without impairing the quality of the emulsion, thereby effecting an important economy in manufacture. Another object is to decrease the amount of gelatine, thus obtaining an additional saving. To these and other ends the invention comprises the novel process and product hereinafter described.

In making a silver bromide emulsion by prior methods the bromide is produced, for example, by reaction of another silver salt, usually nitrate, with a bromide, for instance potassium bromide, or ammonium bromide. In my process as carried out in the preferred manner the bromic reagent is colloidal bromine, preferably in the form of colloidal hydrogen bromide (HBr) or colloidal bromine hydrate, which may, according to my present understanding of it, be represented by the formula $Br.5H_2O$. Using silver nitrate and hydrogen bromide the reaction appears to be $2AgNO_3+2HBr=2AgBr+N_2O_5+H_2O$. In the cooking of the emulsion the nitrogen pentoxide goes off in gaseous form.

In making an emulsion with colloidal bromine not only the amount of silver but also the amount of gelatine can be greatly decreased and at the same time obtain equal covering power. That is, a smaller volume of my finished emulsion will coat as great an area of plate, film or other supporting base as a larger amount of a prior emulsion, and in some cases an even greater area may be covered, with equal or better results when the plate, film or paper is used in the customary way for photographic purposes. For example, considering the degree of opacity obtainable by development and fixation of a fully exposed area of the plate, it has been possible to obtain with my emulsion a greater degree of opacity than with an emulsion containing two and a half times as much silver bromide, of the ordinary non-colloidal form, and ten times as much gelatine. In other words, with my emulsion a saving of sixty per cent of silver bromide and ninety per cent of the gelatine has been effected. This remarkable result is apparently due to two factors: (1) the gelatinous nature of the silver bromide, which forms a homogeneous jelly-like solution, and (2) the colloidal nature of the silver which is precipitated by the development. In fact, under magnifications which clearly reveal the discrete particles of black silver in even the finest-grain emulsions of the prior art, the silver in my emulsion appears continuous, indicating that the silver is a true emulsoid as distinguished from a suspensoid. A very thin deposit is therefore sufficient to give an opacity which in prior emulsions requires a thick deposit in order to cover with the particles of the upper layers the interstices between the particles of the lower layers.

The colloidal bromine (using the expression "colloidal bromine" as a generic term to include the hydrate and the hydrogen bromide referred to above) can be produced in various ways. For example, I dissolve potassium bromate in a solution of tannic acid, using 2.25 parts by weight of the acid to 1 part of the bromate, and preferably using not more than about 150 grams of the acid per liter of the solution. The reaction of the bromate and tannic acid produces colloidal hydrogen bromide and a potassium salt which appears to be tannate. Heating the solution to about 70° C. to insure decomposition of all the bromate, I add a little nitric acid, say 1 gram to each 15 grams of bromate used. A violent reaction ensues, due to decomposition of a little nitrogen pentoxide, and nearly all the tannate settles out. The solution is filtered off and allowed to stand for several weeks for further precipitation of tannate. I then filter again, heat the filtrate to about 60° C., and when it has become quite cold I filter again, leaving substantially pure hydrogen bromide in solution, which solution can be used in making my emulsion, evaporating or adding more or less water if necessary to give a concentration convenient for use. Or the hydrogen bromide solution may be evaporated to dryness, yielding a reddish brown powder which I believe has the composition $Br(H_2O)_5$. This hydrate is stable up to about 100° C., at somewhat higher temperatures it loses water, behaving then as if its composition were $Br(H_2O)_{5/2}$. Both hydrates form homogeneous solutions in water and are stable therein. Such solutions, in convenient concentrations, may be used for making my improved emulsion.

In making an emulsion I decrease the silver salt which the formula calls for and replace the potassium or other bromide with colloidal bromine, using a slight excess over the reacting proportion; and I also decrease the amount of gelatine, since with the normal amount of the latter the emulsion becomes unmanageably viscous. The saving of silver and gelatine may, as already stated, be considerable. For example, in a formula for making an emulsion of excellent quality for cinematographic positives it has been possible to decrease the silver nitrate by 60 per cent and the gelatine by 90 per cent.

I claim:

1. In making photographic emulsions, producing colloidal silver bromide by reaction of a silver salt with a compound of the class consisting of colloidal hydrogen bromide and colloidal bromine hydrate.

2. In making photographic emulsions, producing colloidal silver bromide by reaction of a silver salt with colloidal hydrogen bromide in solution.

3. In making gelatine photographic emulsions, causing a silver salt to react with a compound of the class consisting of colloidal hydrogen bromide and colloidal bromine hydrate, with the production of colloidal silver bromide adapted to take the place of a portion of the gelatine whereby correspondingly less gelatine is required to give suitable body to the emulsion.

4. A gelatine photographic emulsion containing colloidal silver bromide of the kind produced in the presence of gelatine by the reaction of a silver salt with a compound of the class consisting of colloidal hydrogen bromide and colloidal bromine hydrate; said emulsion being characterized by the fact that upon exposure, development and fixation the image is sensibly grainless and has an opacity at least equal to that of an image produced under the same conditions in an emulsion containing a substantially greater amount of silver bromide produced by the reaction of a silver salt and an alkali bromide.

ERNEST GOVETT.